United States Patent [19]

Hoffman, Jr. et al.

[11] 4,442,855

[45] Apr. 17, 1984

[54] FAIL-SAFE SINGLE-STAGE SERVOVALVE

[75] Inventors: Stanley J. Hoffman, Jr., Cheektowaga; William D. Waffner, East Aurora, both of N.Y.

[73] Assignee: Moog Inc., East Aurora, N.Y.

[21] Appl. No.: 315,748

[22] Filed: Oct. 28, 1981

[51] Int. Cl.$^3$ .............................................. G05D 16/00

[52] U.S. Cl. .............................................. 137/83; 91/3

[58] Field of Search ................ 137/83, 625.64, 625.61, 137/625.63; 91/3

[56] References Cited

U.S. PATENT DOCUMENTS 3,137,309 6/1964 Blase .................................... 137/83

3,542,051 11/1970 McFadden ............................ 137/83

3,866,620 2/1975 Morton ................................ 137/83

*Primary Examiner*—Alan Cohan

*Attorney, Agent, or Firm*—Sommer & Sommer

[57] ABSTRACT

A single-stage servovalve has a movable member operatively arranged to selectively divide a continuously-discharged fluid jet between two receiver passages. The hydraulic output of the valve is the differential between the conditions in the receivers. In the event of a hard-over failure of the control system of which the servovalve is a part, a jet deflector surface becomes operative to create a substantially balanced hydraulic condition in the receiver passages, thus terminating control.

27 Claims, 23 Drawing Figures

Fig. 7.
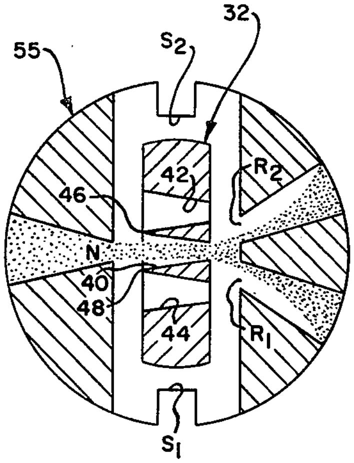
Fig. 7A.
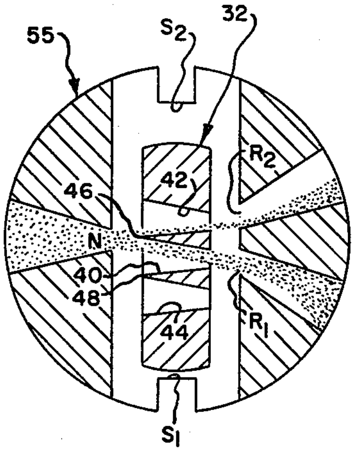
Fig. 7B.
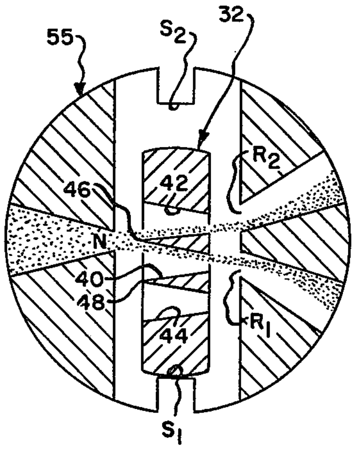
Fig. 8.
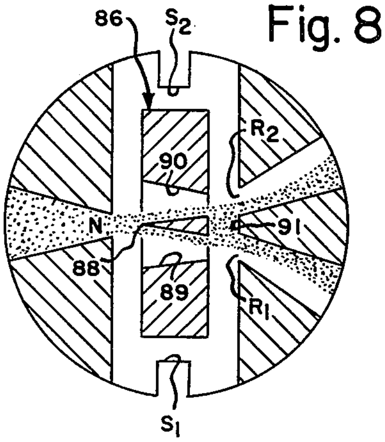
Fig.8A.
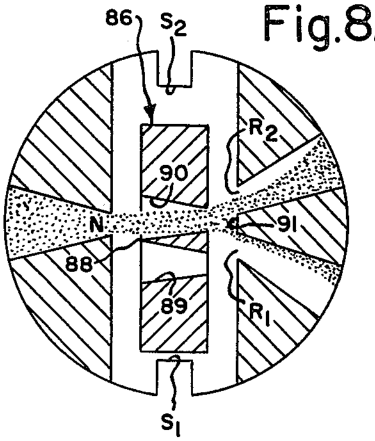
Fig. 8B.
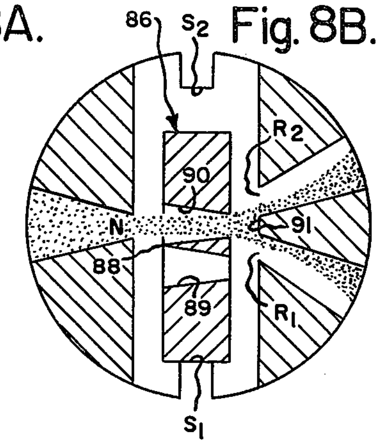
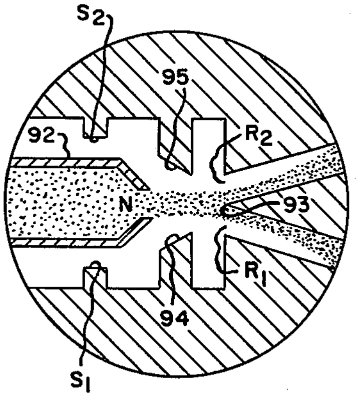
Fig. 9.
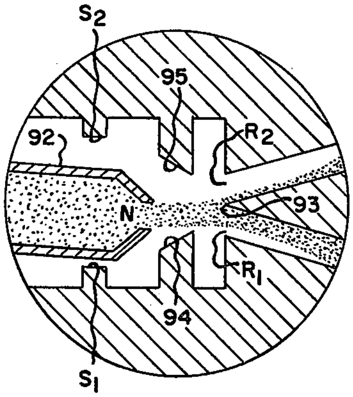
Fig. 9A.
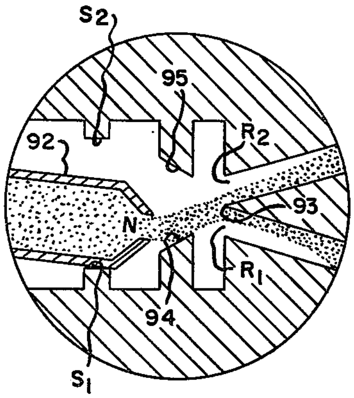
Fig. 9B.

FAIL-SAFE SINGLE-STAGE SERVOVALVE

BACKGROUND OF THE INVENTION

1. Field of the Invention

The present invention relates generally to the field of electrohydraulic servovalves and servocontrol systems, and more particularly to an improved single-stage servovalve wherein a hard-over failure of one system component does not produce a corresponding failure of the hydraulically-controlled output.

2. Description of the Prior Art

Many aerospace vehicles utilize redundant control systems to improve reliability. In this context, redundancy means the presence of alternate control components, such that vehicle operation can continue if one component fails. The performance of the controlling component(s) is usually monitored. A hard-over failure of that component(s) is detected, and control is transferred to a standby component(s).

Servovalves are often used in such redundant control systems, and the valve's hydraulic output, which controls the load, is frequently used to assess system operation. Such monitoring often employs a differential pressure transducer or pressure switch communicating with the valve's output pressures, and a solenoid valve to disconnect that output from the load, and transfer control to another servovalve, should an excessive differential pressure be sensed.

In some redundant systems, it is desirable to nullify or neutralize the servovalve output immediately when a hard-over failure occurs. This avoids unnecessary transient behavior in the load being controlled, as might otherwise occur during the time interval between detection of the hard-over condition and the subsequent steps taken to remove it from the system. Such a fail-safe action has been achieved in a two-stage servovalve by adding additional spool lands and porting on the sliding spool, as shown in U.S. Pat. No. 3,922,955. The spool of this patent can operate in a region of normal four-way flow control on either side of the null position. When the spool in in a hard-over position abutting a stop, both control ports are closed and load motion will cease. Thus, a hard-over condition of the spool effectively terminates fluid control of the load.

However, when a single-stage servovalve is used in a control system, there is no second-stage spool to afford the fail-safe feature. Therefore, it would be desirable to provide an improved single-stage servovalve with a fail-safe capability.

SUMMARY OF THE INVENTION

The present invention provides an improvement in a single-stage jet-type servovalve. Such servovalves may employ a movable flow guide (e.g., U.S. Pat. Nos. 3,542,051 and 3,612,103), or a movable jet splitter, or a movable jet pipe (e.g., U.S. Pat. No. 3,017,864), or a movable jet interrupter (e.g , U.S. Pat. No. 2,982,902), or a movable receiver (e.g., U.S. Pat. No. 2,884,906), or some other means. In such servovalve, a fluid jet is continuously discharged towards one or more receiver passages. The valve has a movable member, such as a flow guide, a jet pipe, or a jet splitter, mounted on a body. The position of the movable member relative to the body, within an operating range of movement, controls the impingement of a fluid jet on one or more receiver passages.

The improvement broadly comprises: at least one stop, preferably adjustable, mounted on the body and operatively arranged to limit further movement of the member in one direction; and at least one deflector surface mounted, in whole or in part, on either the body or the member, and operatively arranged to create a substantially neutral hydraulic condition in the servovalve output when the movable member assumes a hard-over position against the stop. In addition, the inherent decentering torque gradient of a permanent magnet torque motor can be utilized to further enhance the fail-safe operation of the improved single-stage servovalve.

Accordingly, the principal object of the present invention is to provide an improved single-stage servovalve with a fail-safe capability.

Another object is to provide a fail-safe single-stage servovalve, which employs a minimum of moving parts.

Another object is to provide a fail-safe single-stage jet-type servovalve in which a hard-over condition of the movable flow-directing member, for whatever reason, does not produce a corresponding hard-over failure of hydraulic performance.

These and other implicit objects and advantages will become apparent from the foregoing and ongoing specification, the drawings, and the appended claims.

BRIEF DESCRIPTION OF THE DRAWINGS

FIG. 7 is a schematic view of the flow guide shown in FIGS. 1–5 relative to the fixed nozzle and receiver passages.

FIG. 7A is a schematic view similar to FIG. 7, but showing the failing flow guide as moving toward one stop.

FIG. 7B is a schematic view similar to FIG. 7, but showing the failed flow guide in a hard-over condition against the stop.

FIG. 8 is a schematic view of a modified flow guide, embodying a jet splitter, relative to the fixed nozzle and receiver passages.

FIG. 8A is a schematic view similar to FIG. 8, but showing the failing flow guide as moving toward one stop.

FIG. 8B is a schematic view similar to FIG. 8, but showing the failed flow guide in a hard-over against the stop.

FIG. 9 is a schematic view of a movable jet pipe member relative to the receiver passages.

FIG. 9A is a schematic view similar to FIG. 9, but showing the failing jet pipe as moving toward one stop.

FIG. 9B is a schematic view similar to FIG. 9, but showing the failed jet pipe in a hard-over condition against the stop.

DESCRIPTION OF THE PREFERRED EMBODIMENTS

Figure 2:
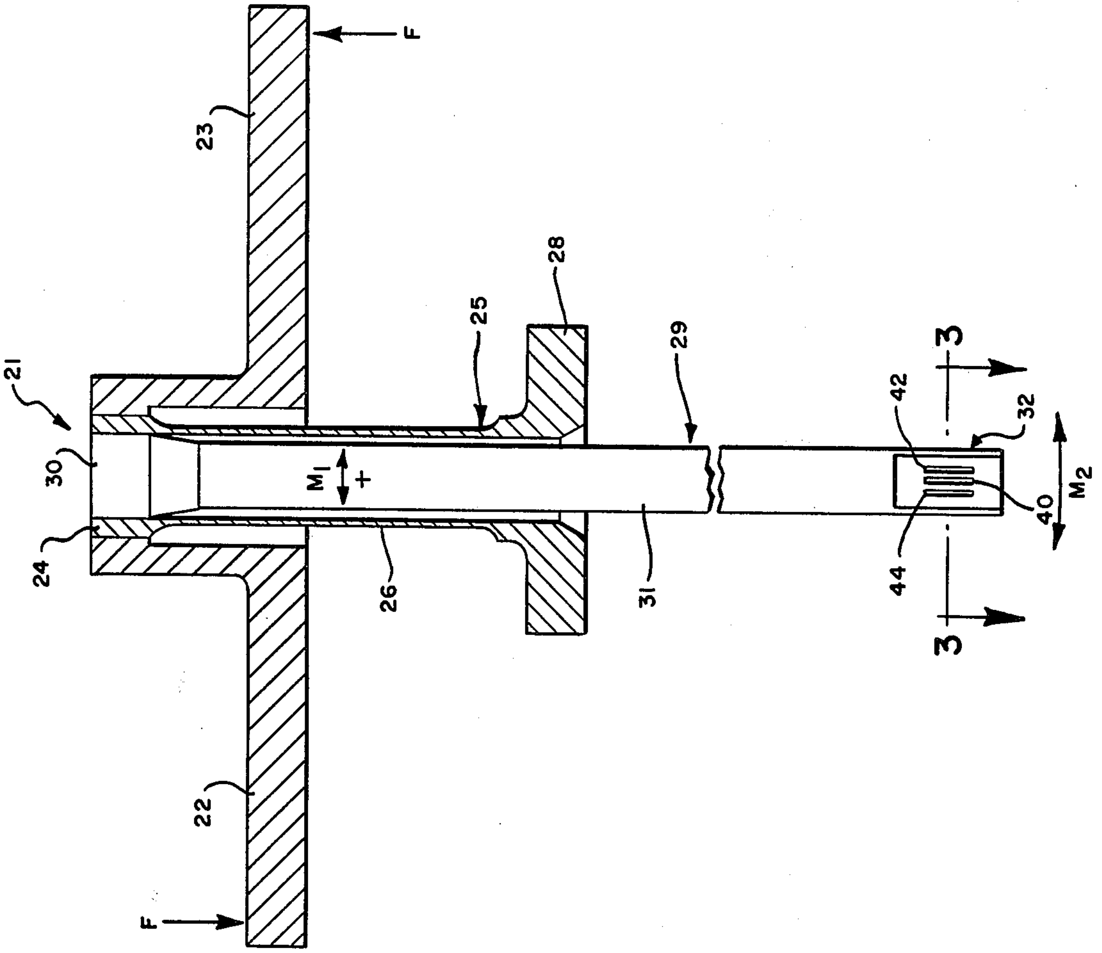
FIG. 2 is an enlarged detail view of the armature-deflector member shown in FIG. 1.

At the outset, it should be clearly understood that like reference numerals are intended to identify the same elements and/or structure consistently throughout the several drawing figures, as such elements and/or structure may be further described or explained by the entire written specification of which this detailed description is an integral part.

Figure 1:
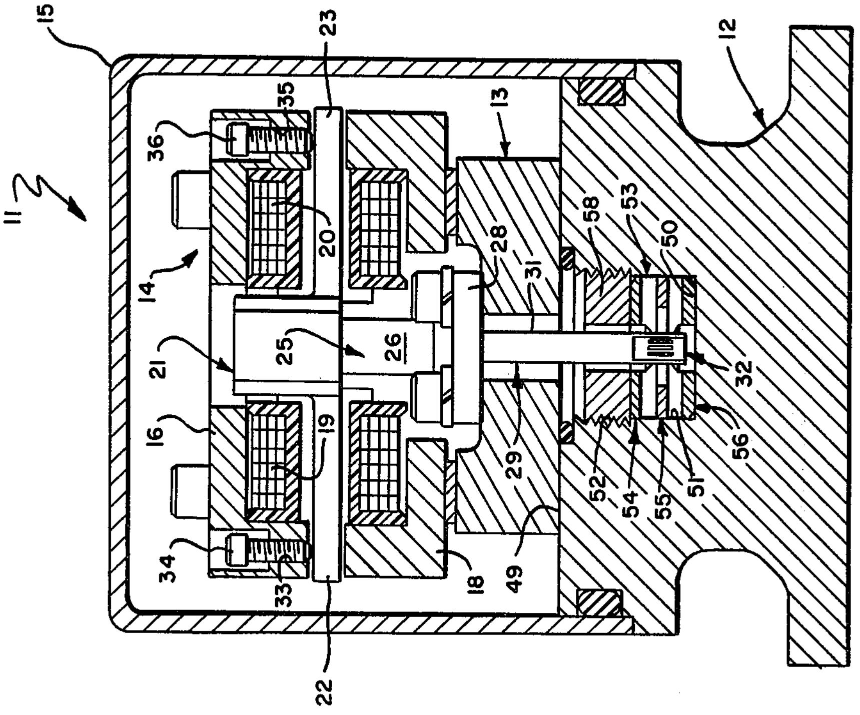
FIG. 1 is a vertical sectional view of one embodiment of a fail-safe jet-type single-stage servovalve.

Referring now to the drawings, and more particularly to FIGS. 1 and 2 thereof, the invention provides an improved single-stage servovalve, of which one presently preferred embodiment is generally indicated at 11. In FIG. 1, this servovalve generally includes a lower body 12 provided with a typical labyrinth of fluid flow passageways (not shown), an intermediate spacer 13 mounted fast to the body, and an upper torque motor 14 mounted on the spacer. A cover 15 is removably mounted on the base and protectively encloses the torque motor. In the conventional manner, this servovalve is adapted to produce a hydraulic output in response to an electrical input signal supplied to the torque motor.

Since the torque motor is individually old in this art (except as hereinafter expressly stated), the following description thereof will be somewhat abbreviated. The torque motor includes upper and lower polepieces 16, 18, spaced apart and magnetically polarized by a pair of permanent magnets (not shown); a pair of coils 19, 20; and an armature-deflector member, generally indicated at 21, having its outstretched left and right armature portions 22, 23 operatively arranged in the air gaps between the facing polepieces. In the well known manner, a suitable electrical signal may be selectively supplied to the coils to exert a force couple, F, on the armature member. As best shown in FIG. 2, the armature is mounted on the thickened upper collar 24 of a flexure tube member, generally indicated at 25, which includes an intermediate thin-wall tubular section 26, and a lowermost base 28 adapted to be mounted on the spacer. In addition to supporting the armature member and permitting pivotal motion thereof due to forces F, the flexure tube also functions to isolate the hydraulic section of the valve from the torque motor section thereof. A deflector member, generally indicated at 29, has its uppermost marginal end portion 30 press-fitted, welded, or otherwise joined to collar 24, has an intermediate rod-like portion 31 extending downwardly within thin-walled section 26 and beyond base 28, and has a marginal portion adjacent its lower end configured as an improved jet deflector or flow guide, generally indicated at 32. Thus, pivotal movement, $M_1$, of the armature-deflector member 21 will cause amplified pivotal movement, $M_2$, of the flow guide 32. Additional details as to the structure and operation of such a torque motor may be found in U.S. Pat. Nos. 3,542,051 and 3,612,013, the aggregate disclosures of which are hereby incorporated by reference.

Adverting now to FIG. 1, the present invention improves the otherwise conventional torque motor 14 by providing two adjustable stops for limiting such pivotal movement of the armature member. To this end, the left side of upper polepiece 16 is provided with a tapped vertical hole 33, in which a threaded bolt 34 is matingly received, to provide a first stop for limiting clockwise pivotal movement of the armature. The right side of the upper polepiece is likewise provided with a tapped vertical hole 35, in which a threaded bolt 36 is matingly received to provide a second stop for limiting counterclockwise pivotal movement of the armature. Each of bolts 34 and 36 may be selectively threaded or unthreaded relative to the upper polepiece so as to adjust or vary the operative position of the limit stop. Since the deflector member 29 is mounted fast to the armature member, the adjustable first and second limit stops also serve to limit the extreme positions of the flow guide 32. The particular placement of the limit stops relative to the armature-deflector member subassembly is not deemed critical, and may be readily varied. For example, such adjustable limit stop could alternatively be mounted on the body so as to directly engage the deflector member 29, if desired.

It is also known to provide a jet deflector or flow guide with a single vertically-elongated nozzle-like opening with convergent planar side walls, as taught by the aforesaid U.S. Pat. No. 3,542,051. However, the improved flow guide 32 is further provided with alternate flow openings on either side of the main nozzle-like opening, for a purpose hereinafter explained.

Figure 3:
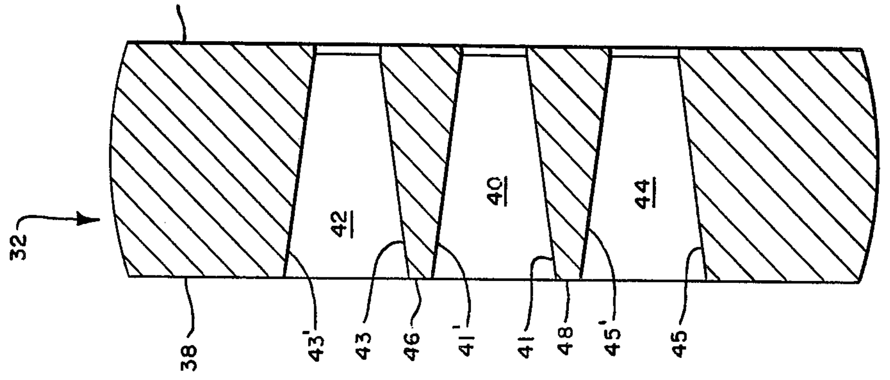
FIG. 3 is an enlarged fragmentary horizontal sectional view taken through the flow guide, generally on line 3—3 of FIG. 2, this view being reoriented 90° in a horizontal plane from that shown in FIG. 2.

As best shown in FIG. 3, the improved flow guide 32 has left and right flat vertical faces 38, 39, and is provided with three horizontally-spaced vertically-elongated rectangular nozzle-like openings (FIG. 2). The central opening 40 provides the main flow-guiding channel for directing the fluid jet through an operating range of movement of the flow guide. This central opening has a large area entrance mouth opening onto left face 38, a narrowed throat-like exit opening onto right face 39, and is laterally bounded by inwardly and rightwardly inclined planar vertical surfaces 41, 41'. The alternate flow openings are similarly configured. Thus, alternate openings 42, 44 severally have a relatively large area entrance mouths opening onto left face 38, a narrowed throatlike exit opening onto right face 39, and are laterally bounded by inwardly and rightwardly inclined planar vertical surfaces 43, 43' and 45, 45', respectively. The inclination and shape of surfaces 43', and 45 is not critical as will be apparent later. The flow guide openings 40, 42 and 44 define at left face 38, vertically-elongated knife-edge-like jet splitters 46, 48 therebetween, which may be sharpened to the extent desired for a purpose hereinafter explained.

Referring now to FIG. 1, a recess extends downwardly into the body 12 from the upper horizontal surface 49 thereof. This recess has an upwardly-facing horizontal circular bottom surface 50, a vertical cylindrical surface 51 rising upwardly therefrom, and an internally-threaded portion 52 continuing upwardly to open onto body upper surface 49. An amplifier subassembly, generally indicated at 53, comprising three stacked segments 54, 55 and 56 (FIG. 4), is arranged within the body recess, and is held in this position by an annular retaining ring 58 threaded into recess upper portion 52. The body is suitably provided with a plurality of passageways (not shown) communicating with various parts of the body recess.

Figure 5:
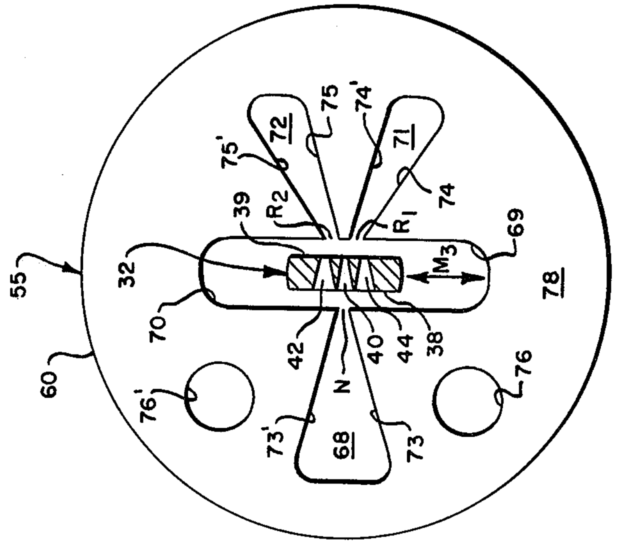
FIG. 5 is an enlarged fragmentary horizontal sectional view thereof, taken generally on line 5—5 of FIG. 4, and showing the upper face of the intermediate segment.
Figure 4:
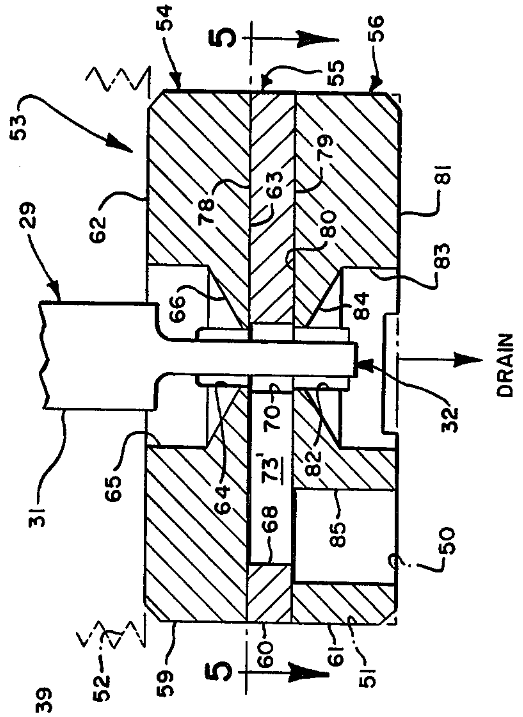
FIG. 4 is an enlarged fragmentary vertical sectional view of the hydraulic amplifier (also rotated 90° from FIGS. 1 and 2), this view showing the stacked cover, intermediate and base segments, and showing the normal operative position of the flow guide.

As best shown in FIGS. 4 and 5, each of the amplifier segments 54, 55 and 56 is a disc-like member having a vertical cylindrical surface 59, 60 and 61, respectively, arranged to face recess surface 51. The cover segment 54 has an upper and lower horizontal faces 62, 63. A diametrical through-slot 64, having a rectangular cross-section, extends upwardly into the cover segment from the lower face 63 thereof. An axial hole, bounded by cylindrical surface 65 and frusto-conical surface 66, extends downwardly into the cover segment from its upper face 62 thereof, and intersects slot 64.

The intermediate segment 55 is provided with a "stick man"-shaped opening having a head portion 68 (FIG. 5), left and right arm portions 69, 70, and left and right leg portions 71, 72. The head portion 68 is partially bounded by vertical surfaces 73, 73' which converge to form an ejector nozzle N at the neck. The left leg portion 71 is partially bounded by vertical surfaces 74, 74' which converge to form a first receiver opening $R_1$ adjacent the body. Similarly, the right leg portion 72 is also bounded by vertical surfaces 75, 75' which converge to form a second receiver opening $R_2$ adjacent the body. The three segments are further provided with suitable holes, such as holes 76, 76' of the intermediate segment (FIG. 5), to accommodate a suitable alignment tool (not shown) by which the amplifier subassembly 53 may be held in an operating position while being clamped together by a retaining ring 58. The intermediate segment has a horizontal upper face 78 arranged to abut cover segment lower face 63, and a horizontal lower face 79.

The base segment 56 is a specially-configured element having a horizontal upper face 80 arranged to abut intermediate segment lower face 79, and a horizontal lower face 81 arranged to abut recess bottom 50. A diametrical slot 82 having a rectangular cross-section and aligned with slot 64, extends downwardly into the base segment from the upper surface 80 thereof. An axial hole, bounded by cylindrical surface 83 and frusto-conical surface 84 extends upwardly into the base segment from its lower surface 81 and intersects slot 82. The base segment is provided with three vertical through passageways. One such passageway 85 communicates with intermediate segment head portion 68. The other two passageways (not shown) communicate with the intermediate segment left and right leg portions 71, 72, respectively. The axial hole provided in the base segment communicates with a drain passageway (not shown) provided in the body, and one or more shallow recesses may extend upwardly into the base segment to facilitate flow of fluid to the drain.

The flow guide 32 is arranged in the arm portions 69, 70 for controlled movement, $M_3$, toward and away from the ends thereof. The left face 38 of the flow guide is arranged to face the nozzle N, and the right face 39 thereof is arranged to face the receiver openings leading into the left and right leg portions 71, 72. During normal operation, fluid is supplied through the body and base segment hole 85 to enter the head portion 68, and is discharged as a jet through nozzle N toward the receiver openings. The position of the interposed flow guide relative to the nozzle is used to divide the momentum of the fluid jet flow between the two receiver openings. Thus, an increased flow directed to one receiver opening is obtained at the expense of a decreased flow to the other. Such flows and/or pressures in the receiver leg portions 71, 72 resulting from jet momentum are transmitted via suitable passageways (not shown), and the differential therebetween may be used to control the performance of some external hydraulically-operated device (not shown).

The principal object of the invention is to provide an improved single-stage servovalve in which a substantially balanced hydraulic condition will exist in the receiver leg portions 71, 72 in the event of a hard-over failure in the control system of which the servovalve is a part. There are many possible sources of error which may cause the flow guide to exceed its normal range of movement and abut one of the stops in a hard-over condition.

Figure 6:
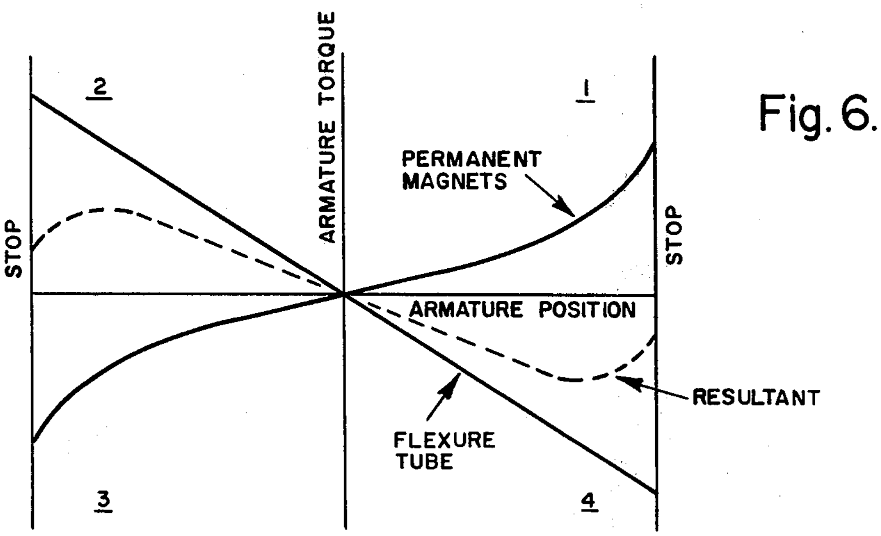
FIG. 6 is a plot of the variation in torque on the armature shown in FIG. 1 due to the permanent magnets and flexure tube of the torque motor throughout the range of armature displacement between the stops.

The magnitude of the rotational displacement $M_1$ (FIG. 2) of the armature-deflector member 21, resulting from steady current in coils 19, 20 (FIG. 1), will be determined by a balance between the current-induced torque and the centering torque acting on the armature. FIG. 6 shows the components of centering torque, together with the resultant or net centering torque acting on the armature. The flexure tube will create a torque tending to center the armature as the armature is positioned away from the mid-position, as shown in quadrants 2 and 4 of the plot in FIG. 6. The permanent magnets will create a torque tending to decenter the armature as shown in quadrants 1 and 3 of FIG. 6. The resultant of these two torque effects may have a destinctive "S" shape depending on placement of the stops of the present invention for a purpose now to be described.

Figure 6A:
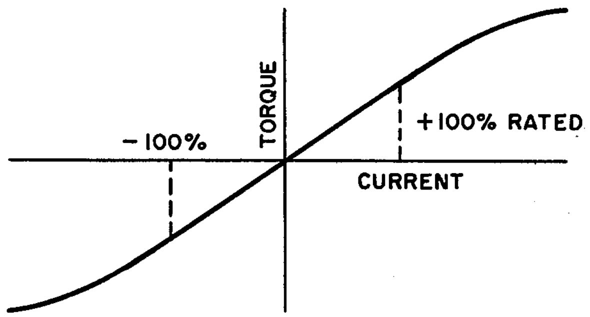
FIG. 6A is a typical plot of torque created on the armature by electrical current in the torque motor coils.

The torque developed by current in the coils of the torque motor associated with electrical signals to the servovalve will have a general characteristic as shown in FIG. 6A. The torque gradient (that is, the slope of torque to current) in the normal operating range between ±100% rated current is relatively constant, whereas the torque developed by excessive current, as would be developed by hard-over failure of a component in the control system, will be higher than rated, but generally at a reduced torque gradient due to saturation of the torque motor magnetic circuit.

Figure 6B:
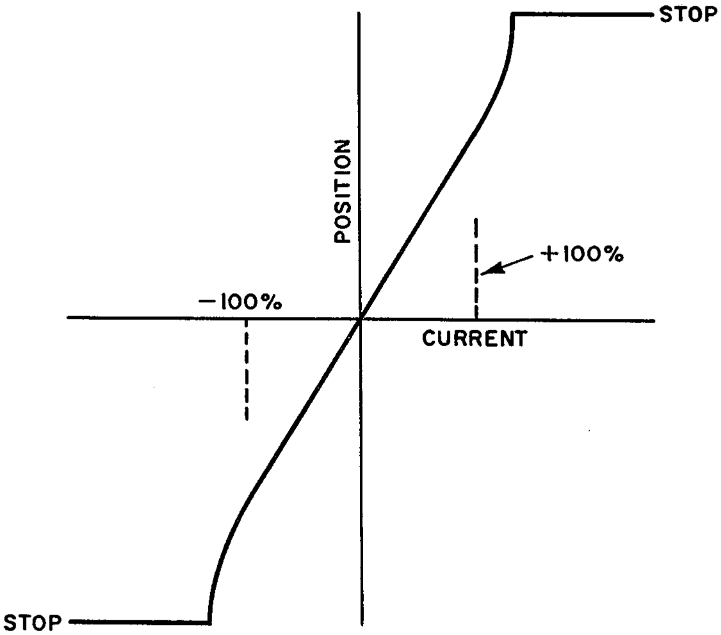
FIG. 6B is a plot of the resultant armature position due to the electrical current in the torque motor coils.

The position of the armature-deflector member resulting from electrical current to the torque motor can be determined by cross-plotting torque from FIG. 6A to position from FIG. 6 with the result shown in FIG. 6B. Note that the position-to-current gradient is approximately constant throughout the operating range between ±100% rated current, as is desirable for normal servovalve performance. An overcurrent condition, however, will cause a much larger than proportional change in armature movement towards the stop than occurs within the normal operating range. Clearly, location of the stops with respect to this inherent non-proportional characteristic of the torque motor can be utilized to further enhance the fail-safe action of the inventive servovalve.

If the stop position is closer to the ±100% rated current position than indicated in FIG. 6, then an impractical amount of separation of the normal operating range of the jet and receivers from the stop condition of the jet and additional deflector surface will be present. If sufficient position separation is provided, but without the non-proportional torque motor condition just described, then an undesirable amount of overcurrent will be necessary to cause the deflector to reach the stop. Furthermore, if the stop position is excessively wide with respect to the torque motor non-proportionality, then the resultant torque on the armature when the armature-deflector is against the stop will move into quadrant 1 or 3 of FIG. 6. This will cause an undesirable "latch" effect wherein removal of the hard-over electrical condition will not result in the armature-deflector returning to the centered position.

Clearly, it is desirable to provide a non-proportional torque motor characteristic in which the position-to-torque gradient increases significantly when the current is above the normal operating range. It is also desirable to provide such a non-proportional torque motor characteristic wherein the polarity of the net armature centering torque does not reverse in the region beyond the normal operating range of armature-deflector position near the position of either stop.

The stops must be located at a position to create a substantially balanced hydraulic condition in reciever legs 71 and 72, as explained previously. Therefore, various parameters of the torque motor, such as length of the airgaps, charge level of the permanent magnets, and stiffness of the flexure tube, must be selected to give the improved fail-safe action associated with the non-proportional torque motor characteristic.

The operation of the first embodiment of the improved servovalve is comparatively illustrated in FIGS. 7, 7A and 7B, in which the first and second stops are schematically indicated as abutment members $S_1$ and $S_2$. As shown in FIG. 7, during normal operation, the flow guide is moved within an operating range of movement, to selectively divide the momentum of the fluid jet between the two receiver openings. In this normal condition, the mouth of central flow guide opening 40 is generally aligned with the nozzle. Fluid discharged by the nozzle passes through flow guide opening 40, and the position of the flow guide determines which receiver opening will be favored with a majority of such diverted fluid jet. Should the flow guide move toward stop $S_1$, exceeding its normal operating range of movement, jet splitter edge 46 will be moved into general alignment with the nozzle, so that some of the fluid jet will be diverted through flow guide main opening 40 to enter receiver opening $R_1$, while the balance of the fluid jet is diverted through flow guide alternate opening 42 to enter receiver opening $R_2$. While the fluid momentum supplied to the receiver openings are not necessarily equal as the flow guide begins to move to a hard-over failed position, the hydraulic output of the valve does not assume a hard-over condition. As shown in FIG. 7B, if a hard-over condition, at which the flow guide abuts stop $S_1$, is reached, the jet splitter edge 46 will axially align with the nozzle, thereby creating substantially equal fluid momentum in the two receiver passages. Thus, the improved valve produces substantially balanced hydraulic conditions in the receiver passages in the event of a hard-over position of the flow guide. If the flow guide were to move against stop $S_2$, the operation would be similar, with the jet being split by splitter edge 48 between flow guide openings 40 and 44. As previously mentioned, the particular placement or positioning of the stops is not deemed critical, and may be readily varied. In the preferred embodiment, the stops are provided on the torque motor and act on the outstretched arms of the armature member. Alternatively such stops might be provided on the body to engage on the deflector member or the flow guide itself. Although not absolutely necessary, it is preferred that the stops, whatever their form, be adjustable so that the appropriate splitter edge 46 or 48 may be aligned with the nozzle so as to create substantially balanced hydraulic output, or zero differential pressure or flow between receivers $R_1$, $R_2$ in the event of a hard-over failure in the control system. The adjustment feature simplifies set-up of the test-failed condition.

MODIFICATIONS

The present invention contemplates that many changes and modifications can be made, and the specific improvement is readily adapted to single-stage servovalves of the jet-splitter or jet-pipe type.

One modification is illustrated in FIGS. 8, 8A and 8B. In this form, the flow guide 86 is configured somewhat differently, and has a jet splitter edge 88 normally aligned with the nozzle. Thus, during normal operation, the flow guide is moved within an operating range of movement, to divide the fluid jet between flow guide openings 89, 90, and thence to receiver passages $R_1$ and $R_2$, respectively. If the flow guide moves beyond its operating range toward stop $S_1$ (FIG. 8A), flow guide opening 90 will begin to come into alignment with the nozzle. When the flow guide abuts stop $S_1$, flow guide opening 90 will be axially aligned with nozzle N, and the jet passing therethrough will be divided equally into receiver passages $R_1$ and $R_2$ by the splitter edge 91 provided on the segment therebetween. Of course, edge 91 may be sharpened to the extent desired. In this embodiment, a hard-over position of the flow guide will again produce substantially equal fluid momentum in the receiver passages. Again, it is perferred that the limit stops be adjustable.

Another modification is illustrated in FIGS. 9, 9A and 9B. In this form, the nozzle N is mounted on the end of a movable jet pipe 92 controlled by a torque motor. Thus, the fluid jet discharged through the movable nozzle is directed against a splitter edge 93, and is divided between receiver passages $R_1$ and $R_2$ (FIG. 9). Should this jet pipe move beyond its operating range toward stop $S_1$ (FIG. 9A), the jet will partially impinge on an inclined deflector surface 94 provided on the intermediate segment, and a portion of the jet will be deflected toward the distant receiver passage $R_2$. In the hard-over failed condition (FIG. 9B), the jet will be deflected so as to create substantially equal flows in the receiver passages. This form is shown as also including another deflector surface 95 in the event that the jet pipe moves against stop $S_2$ as a result of a hard-over failure in the control system.

Thus, each of the embodiments shown in FIGS. 7–9, functions to create substantially balanced fluid momentum in the receiver passages in the event of a hard-over condition of a movable member, be it a flow guide or a jet pipe. A somewhat different function is achieved by the modifications shown in FIGS. 10 and 11.

The embodiment shown in FIG. 10 again has a movable flow guide 96. However, this flow guide has a central opening 98, and arcuate concave deflector surfaces 99, 100 on either side thereof. During normal operation (FIG. 10), the jet discharged from the nozzle passes through opening 98 and is divided between receiver openings $R_1$ and $R_2$ by an intermediate splitter edge 101 provided on the segment therebetween. Thus, during normal operation, differential fluid momentum is created between the receivers. If the flow guide moves beyond its normal operating range toward stop $S_1$ (FIG. 10A), curved deflector surface 100 will move into registry with the jet. Ultimately, when the flow guide abuts stop $S_1$, the fluid jet will impinge upon surface 100 and be deflected away from both receivers. The chamber in which the flow guide is mounted is connected to drain so both receivers then communicate directly to drain. Hence, this embodiment serves to prevent fluid momentum from impinging onto the receiver passages in the event of a hard-over failure (FIG. 10B), thereby giving a substantially balanced hydraulic condition in the receivers.

Figure 10:
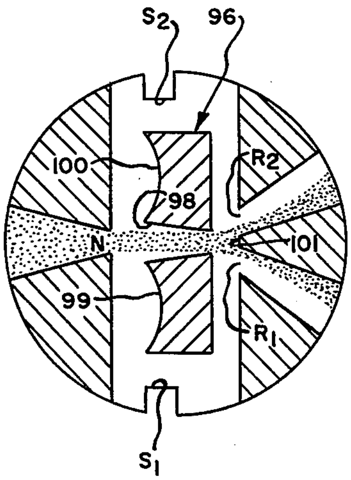
FIG. 10 is a schematic view of another modified flow guide relative to the fixed nozzle and receiver passages.
Figure 11:
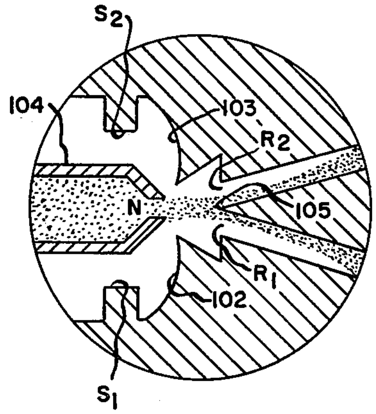
FIG. 11 is a schematic view of another movable jet pipe relative to the receiver passages.
Figure 11A:
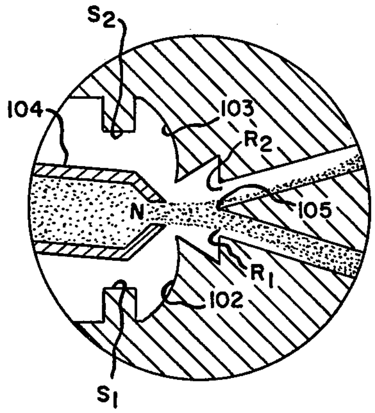
FIG. 11A is a view similar to FIG. 11, but showing the failing jet pipe as moving toward one stop.
Figure 11B:
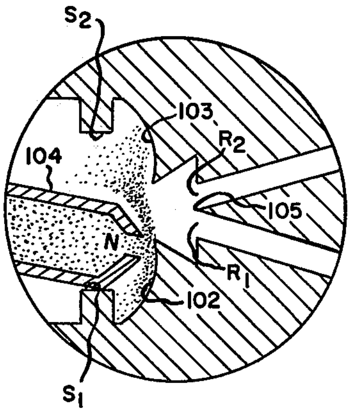
FIG. 11B is a view similar to FIG. 11, but showing the failed jet pipe in a hard-over condition against the stop.

In the embodiment shown in FIG. 11, the intermediate segment is provided with arcuate deflector surfaces 102, 103. During normal operation, a jet discharged through the nozzle of a movable jet pipe 104 is divided between receiver passages $R_1$ and $R_2$ by a splitter edge 105 therebetween (FIG. 11). If the jet pipe exceeds its normal range and moves toward stop $S_1$, a portion of the discharged jet begins to impinge on curved deflector surface 102 (FIG. 11A). In the hard-over condition (FIG. 11B), the entire jet is directed against concave surface 102, and is deflected away from the receiver passages. Again, the opening in which the jet pipe is mounted communicates with drain (not shown). If desired, one or both of deflector surfaces 102, 103 may be arranged proximate the nozzle to restrict the nozzle orifice, thereby reducing the volume of discharged fluid, in a failed condition. As with FIG. 10, this embodiment serves to prevent momentum of the fluid from impinging onto the receivers in the event of a hard-over failure.

Figure 10A:
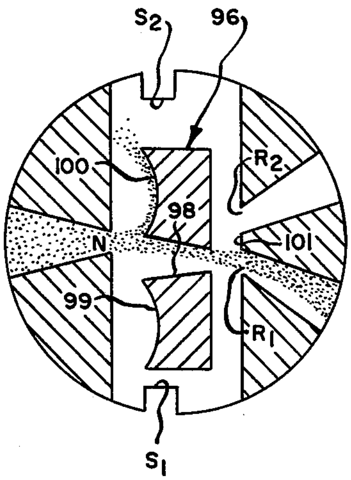
FIG. 10A is a schematic view similar to FIG. 10, but showing the failing flow guide as moving toward one stop.
Figure 10B:
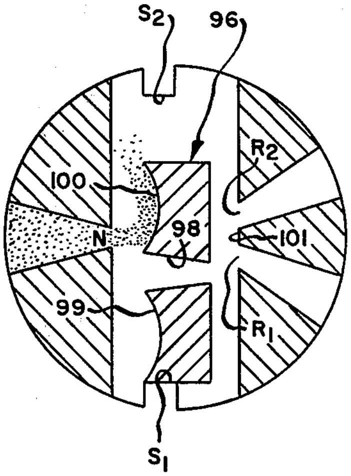
FIG. 10B is a schematic view similar to FIG. 10, but showing the failed flow guide in a hard-over condition against the stop.

Thus, each of the five disclosed embodiments has a movable member, at least one stop, and a deflector surface mounted on either the body or member and operatively arranged to create a substantially equal hydraulic condition in the receivers in the event of a hard-over condition of the movable member, whatever the cause. In FIGS. 7, 8 and 10, the movable member is a flow guide. In FIG. 7, the deflector surface includes at least one wall of alternate passageways 42 and 44. In FIG. 8, the deflector surface comprises at least one of passageways 89 and 90, which functions in a nozzle-like manner in the event of a failure. In FIG. 10, the deflector surface is at least one of surfaces 99, 100, which obstructs the momentum of the fluid jet when moved into position. In the embodiments of FIGS. 9 and 11, the movable member takes the form of a jet pipe. In FIG. 9, the deflector surface is at least one of surfaces 94 and 95. In FIG. 11, the deflector surface is at least one of curved surfaces 102, 103. The feature common to all five embodiments is that a substantially balanced hydraulic condition (i.e., either flow and/or pressure resulting from fluid momentum and load reaction) exists in the receiver passages in the event of a hard-over condition of the movable member. In other words, a hard-over position of the movable member, for whatever reason, does not produce a corresponding hard-over condition of the valve's hydraulic output.

Other changes and modifications of the present invention are contemplated for different versions of single-stage, jet-type servovalves. For example, single-stage servovalves that utilize two fluid jets, each with a single receiver (as depicted in the aforesaid U.S. Pat. No. 2,982,902), could benefit from the fail-safe provisions of the present invention. Also, single-stage servovalves that utilize a single jet and a single receiver (as taught by the aforesaid U.S. Pat. No. 2,884,906) could likewise be equipped with stops and additional deflector means for the fluid jet to provide a fail-safe capability. In such a servovalve having a single receiver, the neutral hydraulic output pressure is generally one-half of the supply pressure. The load being controlled by the servovalve is then biased by a force equivalent to one-half supply pressure in the direction opposite to that encouraged by higher pressure output from the servovalve.

While a presently-preferred embodiment has been shown and described, and several modifications thereof discussed, persons skilled in this art will appreciate that various additional changes and modifications may be made without departing from the spirit of the invention, as defined by the following claims.

What is claimed is:

1. In a single-stage servovalve having a body, wherein a fluid jet is adapted to be discharged toward at least two receiver passages, and having a movable member mounted on said body, the position of said movable member relative to said body within an operating range of movement being adapted to divide said fluid jet between said receiver passages, the improvement which comprises:

a first stop mounted on said body and operatively arranged to limit further movement of said member in one direction; and a first deflector surface mounted on one of said body and member and operatively arranged to create substantially equal jet impingement onto said receiver passages when said member engages said first stop.

2. The improvement as set forth in claim 1 and further comprising:

a second stop mounted on said body and operatively arranged to limit further movement of said member in an opposite direction; and a second deflector surface mounted on one of said body and member and operatively arranged to create substantially equal jet impingement onto said receiver passages when said member engages said second stop.

3. The improvement as set forth in claim 2 wherein at least one of said stops is adjustably mounted on said body so that, when said member engages such stop, the position of said member relative to said body may be varied.

4. The improvement as set forth in claim 3 wherein each of said stops is adjustably mounted on said body.

5. The improvement as set forth in claim 1 and further comprising:

a torque motor adapted to be supplied with an electrical signal, said torque motor having a permanent magnet and having an armature movable in response to said electrical signal, said armature being mounted on said member for movement therewith, said magnet creating a decentering torque gradient on said armature, the magnitude of said decentering torque gradient progressively increasing as said armature moves in one direction, said torque motor also having means for exerting a centering torque gradient on said armature, the magnitude of said centering torque gradient being substantially equal to the magnitude of said decentering torque gradient within said operating range.

6. The improvement as set forth in claim 5 wherein the magnitude of said decentering torque gradient exceeds the magnitude of said centering torque gradient outside said operating range.

7. The improvement as set forth in claim 1 wherein said first deflector surface is arranged to prevent direct fluid momentum of said jet onto said receiver passages when said member engages said first stop.

8. The improvement as set forth in claim 7 wherein said first deflector surface is provided on said member and is interposed between said fluid jet and said receiver passages when said member engages said first stop.

9. The improvement as set forth in claim 8 wherein said first deflector surface is arcuate.

10. The improvement as set forth in claim 7 wherein said first deflector surface is provided on said body.

11. The improvement as set forth in claim 10 wherein said first deflector surface is planar.

12. The improvement as set forth in claim 10 wherein said first deflector surface is arcuate.

13. The improvement as set forth in claim 12 wherein said first deflector surface is positioned proximate the opening through which said fluid jet is discharged such that, when said member engages said first stop, the proximity of said first deflector surface to said opening acts as a restricted orifice to reduce the flow of said fluid jet.

14. The improvement as set forth in claim 1 wherein said first deflector surface is provided on said member and is arranged to permit fluid momentum of said jet onto said receiver passages when said member engages said first stop.

15. The improvement as set forth in claim 14 wherein said member is a flow guide, and said deflector surface bounds an opening through said flow guide which is arranged as a nozzle.

16. In a single-stage servovlave having a body, a nozzle and a receiver passage, and wherein a fluid jet is adapted to be discharged through said nozzle toward said receiver passage, and having a movable member mounted on said body, said member having a portion arranged between said nozzle and receiver passage and operative to control the fractional amount of momentum of said fluid jet impinging on said receiver passage, and having a controller operatively arranged to selectively control the position of said member relative to said receiver passage throughout an operating range having a centered position, the improvement which comprises:

a first stop mounted on said body and operatively arranged to limit further movement of said member portion in one direction; and a first deflector surface mounted on one of said body and member and operatively arranged to cause the amount of momentum of said fluid jet impinging on said receiver passage when said member engaged said first stop to be substantially equal to the amount of momentum of said fluid jet impinging on said receiver passage when said member is in said centered position.

17. In a single-stage servovalve having a body, a nozzle and two receiver passages, and wherein a fluid jet is adapted to be discharged through said nozzle toward said receiver passages, and having a movable member mounted on said body, said member being operative to control the fractional amount of the momentum of said fluid jet which is directed into said receiver passages, and having a controller operatively arranged to selectively control the position of said member relative to said body throughout an operating range of movement about a centered position, the improvement which comprises:

a first stop mounted on said body and operatively arranged to limit further movement of said member position in one direction; and a first deflector surface mounted on one of said body and member and operatively arranged to cause the differential of a fluid condition existing between said receiver passages when said member engages said first stop to be substantially equal to the differential of a fluid condition existing between said receiver passages when said member is in said centered position.

18. The improvement as set forth in claim 17, and further comprising:

a second stop mounted on said body and operatively arranged to limit further movement of said member portion in another direction; and a second deflector surface mounted on one of said body and member and operatively arranged to cause the differential of a fluid condition existing between said receiver passages when said member engages said record stop to be substantially equal to the differential of a fluid condition existing between said receiver passages when said member is in said centered position.

19. The improvement as set forth in claim 17 wherein said member is a flow guide.

20. The improvement as set forth in claim 17 wherein said member is a jet pipe.

21. The improvement as set forth in claim 17 wherein said member is a jet splitter.

22. The improvement as set forth in claim 17 wherein said controller is a torque motor adapted to be supplied with an electrical signal, said torque motor including an armature movable to a position commanded by said signal, and wherein said member portion is mounted for movement with said armature.

23. The improvement as set forth in claim 22 wherein said first stop is arranged to engage said armature.

24. The improvement as set forth in claim 22 wherein said torque motor includes a permanent magnet, a portion of said armature being movable in response to said command signal, said magnet creating a decentering torque gradient on said armature, the amount of said decentering torque gradient progressively increasing as said armature portion moves away from said centered position.

25. The improvement as set forth in claim 24 and further comprising means for exerting a centering torque gradient on said armature.

26. The improvement as set forth in claim 25 wherein the magnitude of said centering torque gradient substantially equals the magnitude of said decentering torque gradient within said operating range.

27. The improvement as set forth in claim 25 wherein the magnitude of said decentering torque gradient exceeds the magnitude of said centering torque gradient when the position of said armature portion is outside said operating range.

* * * * *